US012165338B2

(12) United States Patent
Eidelberg et al.

(10) Patent No.: US 12,165,338 B2
(45) Date of Patent: Dec. 10, 2024

(54) COMPUTER VISION AIRCRAFT DETECTION

(71) Applicant: CANADIAN UAVS INC., Calgary (CA)

(72) Inventors: Arkady Eidelberg, Calgary (CA); Sean Greenwood, Cochrane (CA)

(73) Assignee: CANADIAN UAVS INC.

(*) Notice: Subject to any disclaimer, the term of this patent is extended or adjusted under 35 U.S.C. 154(b) by 487 days.

(21) Appl. No.: 17/518,393

(22) Filed: Nov. 3, 2021

(65) Prior Publication Data
US 2022/0138968 A1    May 5, 2022

(51) Int. Cl.
G06K 9/00    (2022.01)
G01S 13/04    (2006.01)
(Continued)

(52) U.S. Cl.
CPC .............. G06T 7/254 (2017.01); G01S 13/04 (2013.01); G01S 13/06 (2013.01); G01S 13/52 (2013.01);
(Continued)

(58) Field of Classification Search
CPC ........ G06V 10/20; G06V 10/22; G06V 10/24; G06V 10/25; G06V 10/26; G06V 10/267; G06V 10/28; G06V 10/30; G06V 10/34; G06V 10/36; G06V 10/44; G06V 10/62; G06V 10/70; G06V 10/74; G06V 10/764; G06V 20/10; G06V 20/50; G06V 20/52; G06V 20/54; G06V 2201/07; G06T 3/12; G06T 5/50; G06T 5/70; G06T 5/73; G06T 7/10; G06T 7/11; G06T 7/12; G06T 7/13; G06T 7/136; G06T 7/194; G06T 7/20; G06T 7/246; G06T 7/254; G06T 7/60; G06T 7/70; G06T 2207/10032; G06T 2207/10044; G06T 2207/20172; G06T 2207/20182; G06T 2207/20192; G06T 2207/20212; G06T 2207/20216; G06T 2207/30212; G06T 2207/30232; G06T 2207/30241; B64C 39/024;
(Continued)

(56) References Cited

U.S. PATENT DOCUMENTS 5,519,618 A * 5/1996 Kastner .................. G08G 5/065
701/120
7,327,309 B2 * 2/2008 Wimmer ................ G01S 7/298
342/185

(Continued)

Primary Examiner — Eric Rush
(74) Attorney, Agent, or Firm — MBM Intellectual Property Law LLP

(57) ABSTRACT

Methods and systems for a method for tracking airborne objects include receiving a data set including a plurality buffer images where the data set is associated with a timestamp. Converting each of the plurality of buffer images into a plurality of radial images associated with the timestamp. Subtracting a background image from plurality of radial images to produce a plurality of subtracted images. Denoising each of the plurality of subtracted images to produce a plurality of threshold images. Detecting a track within the plurality of threshold images. Comparing the track across the plurality of threshold images to identify a flying object from the track, and storing a set of geospatial data points and attributes of the flying object.

12 Claims, 15 Drawing Sheets

(51) Int. Cl.
*G01S 13/06* (2006.01)
*G01S 13/52* (2006.01)
*G01S 13/66* (2006.01)
*G05D 1/00* (2006.01)
*G06F 18/22* (2023.01)
*G06T 5/70* (2024.01)
*G06T 7/194* (2017.01)
*G06T 7/254* (2017.01)
*G06T 7/70* (2017.01)
*G06V 10/26* (2022.01)
*G06V 10/30* (2022.01)
*G06V 10/62* (2022.01)
*G06V 10/70* (2022.01)
*G06V 20/10* (2022.01)
*G08G 5/00* (2006.01)

(52) U.S. Cl.
CPC .............. *G01S 13/66* (2013.01); *G05D 1/101* (2013.01); *G06F 18/22* (2023.01); *G06T 5/70* (2024.01); *G06T 7/194* (2017.01); *G06T 7/70* (2017.01); *G06V 10/267* (2022.01); *G06V 10/30* (2022.01); *G06V 10/62* (2022.01); *G06V 10/70* (2022.01); *G06V 20/10* (2022.01); *B64U 2201/00* (2023.01); *G06T 2207/10032* (2013.01); *G06T 2207/10044* (2013.01); *G06V 2201/07* (2022.01); *G08G 5/0078* (2013.01)

(58) Field of Classification Search
CPC ..... B64U 2201/00; G01S 13/02; G01S 13/04; G01S 13/06; G01S 13/42; G01S 13/422; G01S 13/426; G01S 13/50; G01S 13/52; G01S 13/538; G01S 13/56; G01S 13/58; G01S 13/66; G01S 13/72; G08G 5/0069; G08G 5/0073; G08G 5/0078; G08G 5/0082; G08G 5/04; G05D 1/101; G05D 1/12; G06F 18/10; G06F 18/20; G06F 18/21; G06F 18/22; G06F 18/24
USPC ....... 382/100, 103, 104, 106, 107, 159, 181, 382/190, 199, 209, 217, 224–228, 254, 382/257, 260, 263, 264, 266, 274–276, 382/282, 291, 293; 342/25 R, 25 A, 342/25 B, 27–29, 36, 37, 61–63, 65, 104, 342/107–109, 118, 159, 160, 176, 179, 342/180, 182, 183, 185, 195, 450, 451, 342/453, 455, 456, 458; 348/117, 135, 348/143–149, 162, 169–172; 701/1, 3, 701/16, 17, 28, 120, 300–302
See application file for complete search history.

(56) References Cited

U.S. PATENT DOCUMENTS

| | | | | |
|---|---|---|---|---|
| 9,081,092 | B1* | 7/2015 | Friesel | G01S 13/426 |
| 10,302,759 | B1* | 5/2019 | Arteaga | G08G 5/0082 |
| 10,317,518 | B2* | 6/2019 | Warnick | G01S 13/42 |
| 10,725,169 | B2* | 7/2020 | Goossen | G01S 13/765 |
| 2010/0256840 | A1* | 10/2010 | Call | G01S 5/02522 |
| | | | | 701/17 |
| 2010/0292871 | A1* | 11/2010 | Schultz | G08G 5/045 |
| | | | | 342/29 |
| 2015/0261869 | A1* | 9/2015 | Lee | G06F 16/53 |
| | | | | 707/710 |
| 2019/0107613 | A1* | 4/2019 | Degani | G01S 13/536 |
| 2020/0326418 | A1* | 10/2020 | Keijer | G01S 13/72 |
| 2021/0025975 | A1* | 1/2021 | Seeber | G06V 20/13 |
| 2022/0189326 | A1* | 6/2022 | Hamminga | G06V 20/54 |

* cited by examiner

400

COMPUTER VISION AIRCRAFT DETECTION

FIELD OF THE INVENTION

The present invention pertains to control of unmanned aerial vehicles (UAVs), in particular the present invention pertains to the beyond visual line of sight (BVLOS) detection of other aircraft in an airspace occupied by a UAV.

BACKGROUND

Unmanned aerial vehicles (UAVs), commonly known as drones, are a type of flying object characterized in that they do not have a human pilot on board. Drones come in a number of sizes and are used in a wide variety of fields such as aerial photography, remote data collection, logistics, military applications, and others. Drones come in a variety of sizes from handheld to full size aircraft.

In many countries, the use of many types of drones are regulated by government and a common requirement is that drones must be able to find, classify, and steer clear of other aircraft. This is known as "detect and avoid." In some cases, an operator is located in a ground station or vehicle and must perform the job of detecting other aircraft. Optical systems exist to aid an operator in performing detect and avoid but this limits the distance that a drone may fly from its base to within visual line of sight.

There exist ground-based radar systems to detect flying objects beyond line of sight, but these are expensive solutions that limit their use in many applications. Radar systems may be included on board larger drones but for smaller drones, practical weight limits prevent their use.

Therefore, there is a need for a method and apparatus for detecting flying objects beyond line of sight that may be economically used with small drones with limited weight capacity.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for detecting flying objects beyond visual line of sight (BVLOS) within an airspace occupied by a drone and using the information provided to control the drone to avoid any detected flying objects. Embodiments convert a time series of outputs from a radar system into a time series of radial image frames and utilize computer vision (CV) techniques to process the frames to detect flying objects.

In accordance with embodiments of the present invention, there is provided a method for tracking airborne objects. The method includes receiving a data set including a plurality of buffer images where the data set is associated with a timestamp. Converting each of the plurality of buffer images into a plurality of radial images associated with the timestamp. Subtracting a background image from plurality of radial images to produce a plurality of subtracted images. Denoising each of the plurality of subtracted images to produce a plurality of threshold images. Detecting a track within the plurality of threshold images. Comparing the track across the plurality of threshold images to identify a flying object from the track, and storing a set of geospatial data points and attributes of the flying object.

A further embodiment includes updating the background prior to receiving the data set.

In a further embodiment, denoising the plurality of subtracted images includes applying a salt and pepper algorithm and blur algorithm to at least one of the plurality of subtracted images.

In a further embodiment, detecting a track comprised applying a contour algorithm to at least one of the plurality of threshold images.

In a further embodiment, identifying the flying object includes comparing the track to a known flying object characteristic.

In a further embodiment, identifying the flying object includes comparing the track to a known aircraft schedule.

In a further embodiment, the attributes include a level of confidence of the identification of the flying object.

In a further embodiment, the track in a first threshold image of the plurality of threshold images is used to define a region of interest in subsequent threshold images of the plurality of threshold images, and detecting the track includes searching for the track within the region of interest.

In a further embodiment, identifying the flying object from the track includes applying computer vision techniques to the plurality of threshold images.

In a further embodiment, the computer vision techniques include convex hall extraction or contour detection.

In a further embodiment, the data set includes data in a 360 degree direction around a geographic point.

In accordance with embodiments of the present invention, there is provided a system for controlling the operation of a drone within a beyond visual line of sight (BVLOS) airspace. The system includes a network interface for receiving a data set, an operator display, and a computing device. The computing device including a CPU and a non-transitory memory storing instruction which when executed by the CPU cause the computing device to receive a data set including a plurality buffer images. The data set is associated with a timestamp. Convert each of the plurality of buffer images into a plurality of radial images associated with the timestamp. Subtract a background image from plurality of radial images to produce a plurality of subtracted images. Denoise each of the plurality of subtracted images to produce a plurality of threshold images. Detect a track within the plurality of threshold images. Compare the track across the plurality of threshold images to identify a flying object from the track, and store a set of geospatial data points and attributes of the flying object.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention include a method and apparatus for detecting flying objects beyond visual line of sight (BVLOS) in a vicinity of a drone and using the information provided to control the drone to avoid any detected flying objects. Embodiments convert a time series of outputs from a radar system into a time series of radial image frames and utilize computer vision (CV) techniques to process the frames to detect flying objects.

Figure 1:
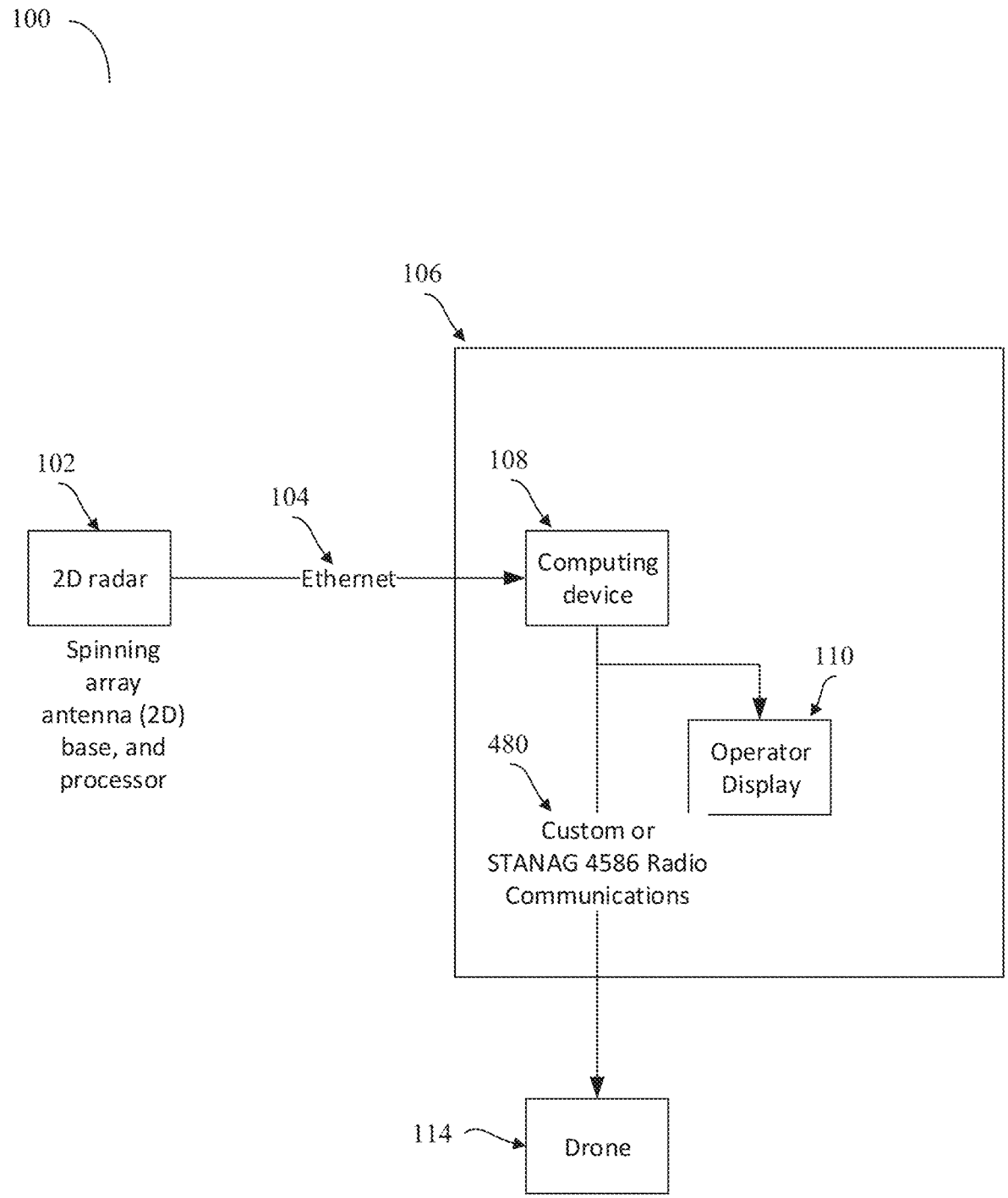
FIG. 1 illustrates a system for controlling a drone, according to an embodiment.

FIG. 1 illustrates a system for controlling the operation of a drone beyond visual line of sight. The system 100 includes a radar 102 and an operator environment 106 that includes a computing device 108 and operator display 110. An operator utilizes the system 100 to operate drone 114 to ensure that drone 114 is able to detect and avoid other flying objects even when drone 114 is beyond visual line of sight of the operator.

Radar 102 is a two dimensional radar that sweeps an area 360 degrees around the location of radar 102. In an airspace of interest, radar 102 may be a marine radar operating in the x-band (9.4 GHz) capable of detecting flying objects at BVLOS range. Radar 102 may utilize a slotted waveguide array antenna that maybe mounted on and rotate above operator environment 106. The antenna and radar 102 may also be located separately from operator environment 106. Radar 102 may also represent multiple, networked radar and ADS-B receivers that allow for coverage of a larger area and the reception of more accurate data about the state of the airspace that overlaps between the multiple radar sensors. This serves to increase the dimensionality of the data and helps to classify reflections and detected objects. Additional types of sensors may also be used such as different types of hardware capable of collecting doppler data in addition (or instead) of pulse radar.

Operator environment 106 may be an open, sheltered, or enclosed area to house an operator, computing device 108, and additional operator equipment required by the operator to monitor, control, and otherwise operate a drone 114. Other operator equipment may include operator display 110, input devices, etc. In embodiments, operator environment 106 may be an enclosed vehicle such as a cargo van or a mobile or fixed building.

Computing device 108 may be a laptop computer, desktop computer, tablet, and may access local or remote storage. Computing device 108 is coupled to radar 102 through a connection 104 such as Ethernet, serial port, USB, or other wired or wireless computer interface.

Operator display 110 and operator input devices are used to control and receive status information from one or more drones 114 through a radio interface. Operator display 110 includes information on the status of the drone, the location and movement of the drone and any other flying objects in the airspace, and attributes of any flying objects in the airspace. Operator display 110 may combine information from different sources, such as information from the drone, drone flight control systems, and visual line of sight or BVLOS radar or detection systems.

Drone 114, also known as a UAV, may be any sort of unmanned flying object controlled by the operator, and may be controlled by an operator or be automatically controlled.

Figure 2:
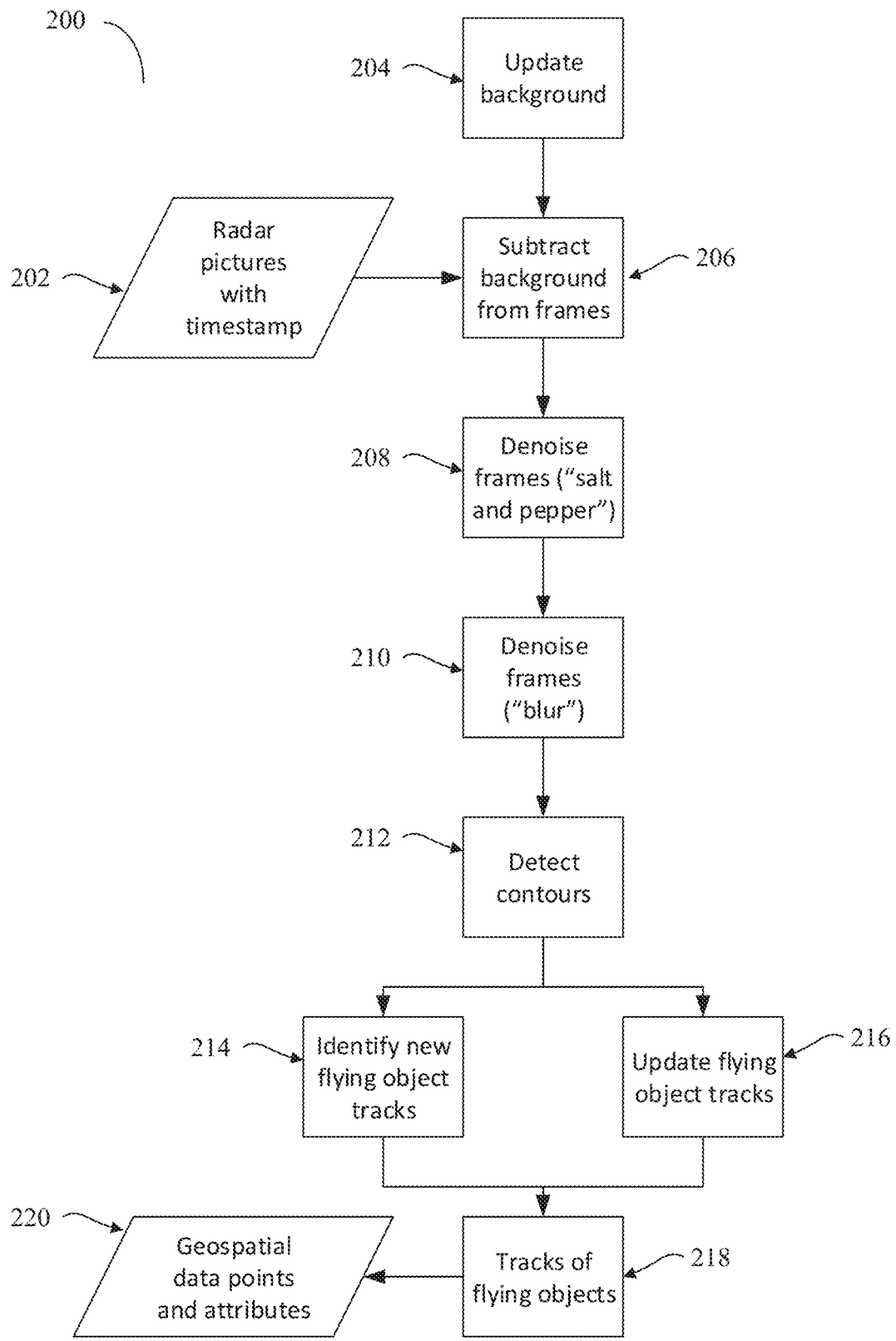
FIG. 2 illustrates a method for detecting flying objects, according to an embodiment.

FIG. 2 illustrates a method for detecting flying objects to enable a drone to detect and avoid flying objects in its airspace even when the drone or flying object is located beyond line of sight of operator environment 106, according to an embodiment. Radar 102 is configured to sweep the airspace as is known in the art. In some embodiments, radar 102 is configured to scan an airspace, in a substantially horizontal plane, 360 degrees around the location of radar 102. In step 202, reflections are received by radar 102 for each rotational sweep of the antenna. For each radar sweep a timestamped electro-optic (EO) buffer image may be produced.

In embodiments, buffer images may be produced for each radar sweep at a frequency of approximately 0.4 Hz. Over time, the timestamped buffer images produce a timestamped data set portraying the airspace around the radar 102 over a period of time. Detected objects may be flying vehicles such as fixed wing aircraft, helicopters, balloons, birds, birds. Detected objects may include real or imaginary objects such as weather, rain, snow, hail, reflections from ground objects, etc. Buffer images may also contain interference such as back-scatter, clutter, or noise caused by the radar hitting solid ground, buildings, trees, etc.

Figure 3:
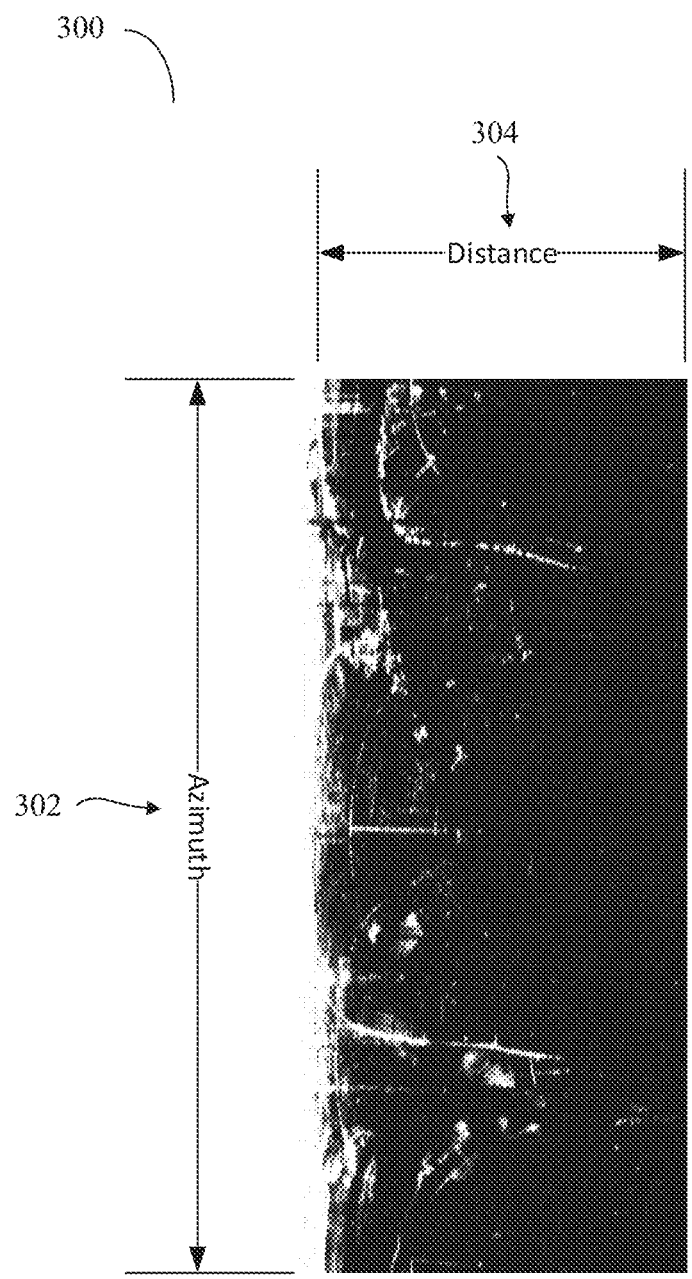
FIG. 3 illustrates a buffer image according to an embodiment.

As illustrated in FIG. 3, the buffer image 300 is a data file representing reflections of any objects that detected during the sweep. The buffer image may be structured as an array of data or "pixels". Each row of the array 302 represents an azimuth (angle) in a plane around the radar substantially parallel to the ground. Each column 304 of the array represents a distance from the position of the radar system out towards the maximum range of the radar. For each azimuth and distance, the pixel represents an intensity of the reflected echo detected by the radar receiver. This array corresponds to a given time and includes associated meta data. Metadata may include an orientation or reference of what the radar was looking at during the sweep, the size of the data array, and the distance resolution and range the radar is operating at. In many cases metadata, resolution, and distance may be configured through radar controls. Embodiments store buffer images over time in a data set. The data set and each buffer image may be stored in a raw format or in a processed format.

In an example, the data array of a buffer image may be 496 pixels wide and 4095 pixels high. This allows for the distance to be divided into 496 increments out to the maximum distance and for the azimuth of the radar sweep to be divided into 4095 angular increments. Each azimuth and distance has an associated one byte pixel allowing for 256 values. Each pixel in the image represents the intensity of the echo reflection detected by the radar for each azimuth and configured distance. The farther something is to the right in the data array image, the farther it is from the radar location, where the first column (left of the image) is just next to the radar and the farthest pixel (right of the image) is at the current range setting of the radar.

In practice, the actual number of radar readings may be less than the number of angular increments. For example, there may only be a reading every $2^{nd}$ or $4^{th}$ degree. In this case the buffer image may be reduced to include only array lines (corresponding to azimuth) without loss of data. A raw buffer image with 8190 lines may be reduced to a buffer image with only 4095 lines.

Figure 4:
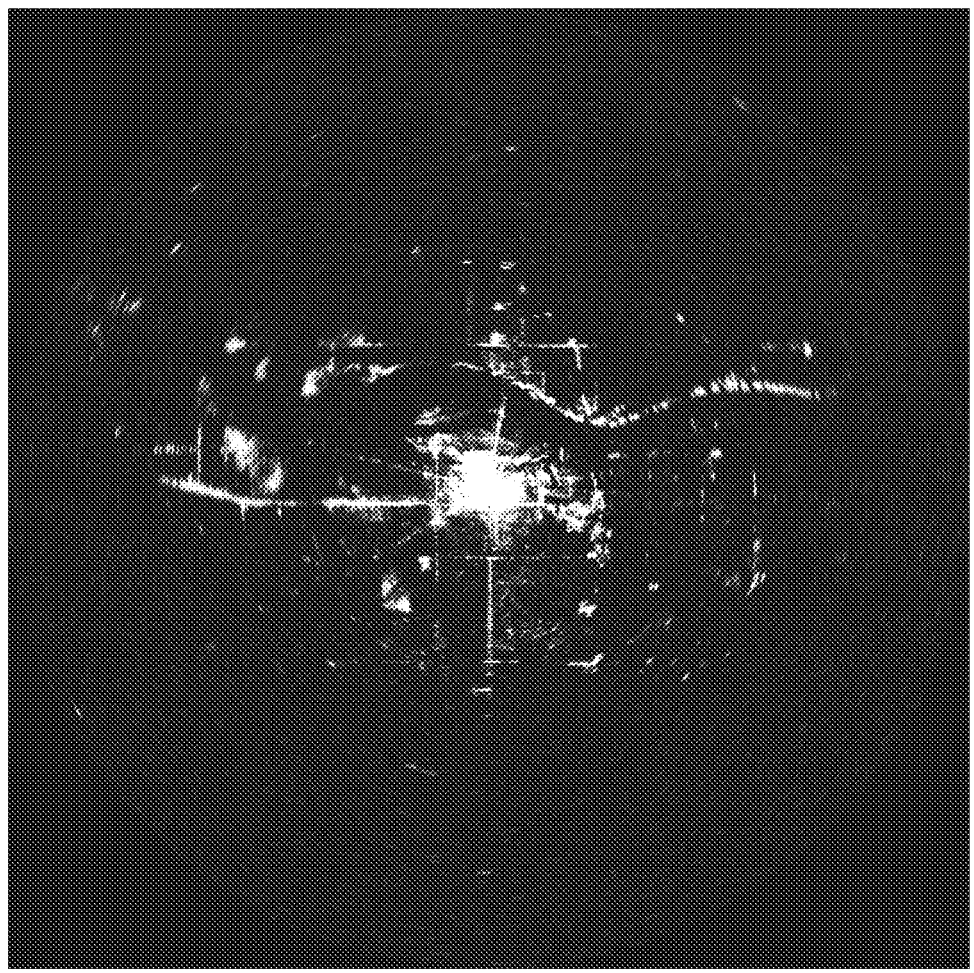
FIG. 4 illustrates a radial image according to an embodiment.
Figure 5:
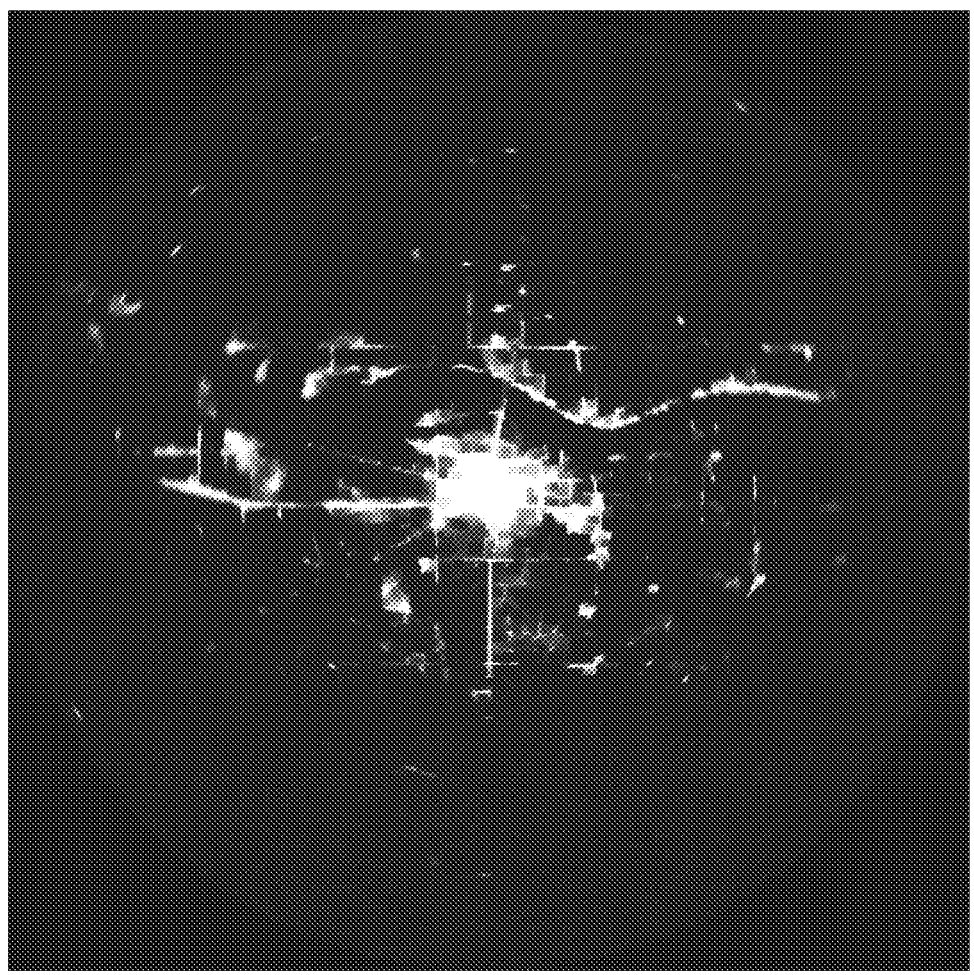
FIG. 5 illustrates a radial image denoised by being blurred according to an embodiment.

Once each buffer image is reduced, if required, it is converted into a "radial image," which is a topographical representation of the radar sweep. As illustrated in FIG. 4, the radial image 400 has an x and y dimension that correspond to a cartesian coordinate system similar to a map of the area covered by the radar. Since the buffer images have one row for each swept azimuth, data from multiple azimuths may be mapped to a single point in the radial image. This effect will occur more frequently the closer the topographical point is to the position of the radar station in the radial image. Multiple intensity data points from the buffer image that map to the same point in the radial image may be aggregated by various techniques including using a weighted average. A weighted average may be calculated by averaging rows or the buffer image above and below a given the row for a given azimuth. For example, in order for us to draw a "ray" on the radial image corresponding to azimuth 100, the 6 rows above and below the row corresponding to azimuth 100 in the buffer image may be averaged with a bias towards the row corresponding to azimuth 100.

Radar 102 may transmit the data set over network 104 to computing device 108. Software in computing device 108 may utilize a software development kit (SDK) to incorporate functions and routines to access, receive, and process the data set. The data set may be transmitted using standardized protocols, such as IEC 61162, or other standard or proprietary standards. When computing device 108 receives the data set, which may include one or more EO buffer images for each timestamp, a radial image frame is created. Buffer images may be received from more than one radar or other system which may be combined into a single buffer frame for further processing. Buffer images may include one or more vectors presenting information such as a speed, course, intensity, etc. Each radial image frame is a representation of the buffer image using an image file format on which computer vision processing techniques may be applied. In embodiments, the image file format of a frame may be a JPEG, GIF, TIFF, PNG, or other bitmapped image file format.

Figure 7:
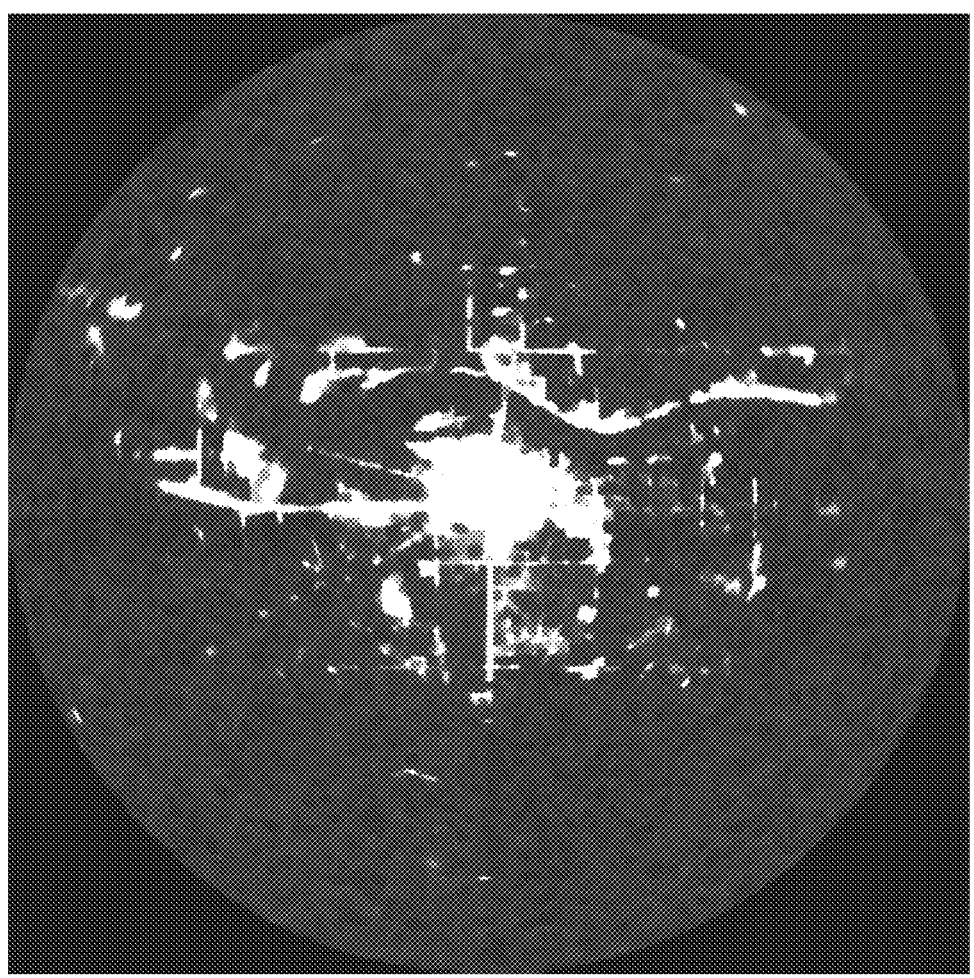
FIG. 7 illustrates a background image according to an embodiment.

In step 204, computing device 108 creates and updates a background image (as illustrated in FIG. 7) of the airspace during a "warm up" period. The background image captures unwanted objects such as weather, rain, snow, hail, reflections from ground objects, etc. The background image may also capture interference such as back-scatter, clutter, or noise caused by the radar hitting solid ground, buildings, trees, etc.

Figure 6:
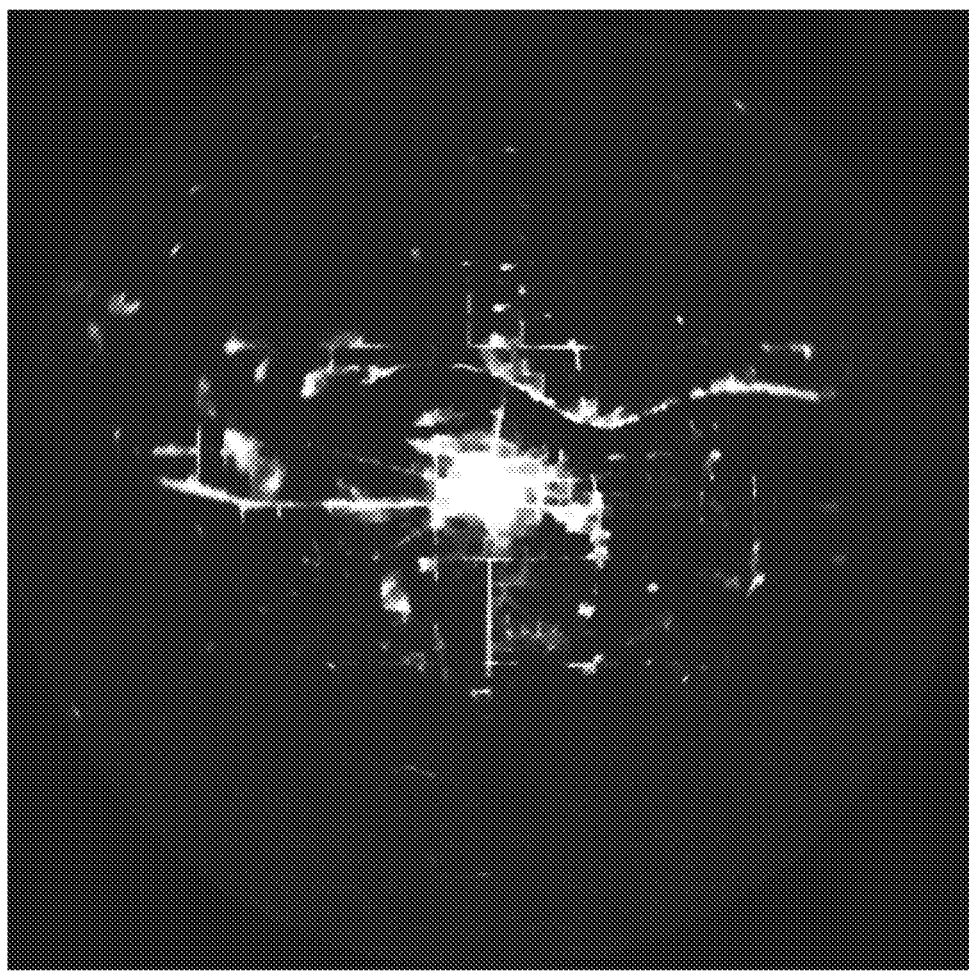
FIG. 6 illustrates a radial image denoised by being closed and opened and "brightened" according to an embodiment.

Prior to commencing drone operation, computing device 108 initializes the background by accumulating time-stamped radial images 400 and calculating a moving average value for each pixel in the frame for a series of radial images. As shown in FIG. 6, the background image may also be further denoised by being blurred. As shown in FIG. 7, the background image may be also denoised by being Closed and Opened (a way to "fill" holes) and "brightened", where pixels are multiplied by a constant and incremented by a minimal weight.

In an example, images from 10 to 30 sweeps are processed to produce a stable background image 700. Other computer vision techniques may also be used to process the background image.

This establishes the background for the airspace that will exist in every future frame during operations. While the background is mostly constant, it is periodically updated during operation of the system to accommodate for unexpected changes in the background. One of the most common changes to the background is heavy weather patterns such as rain or snow. Once a threshold of confidence in the background is reached, the system is ready to identify flying objects.

Figure 8:
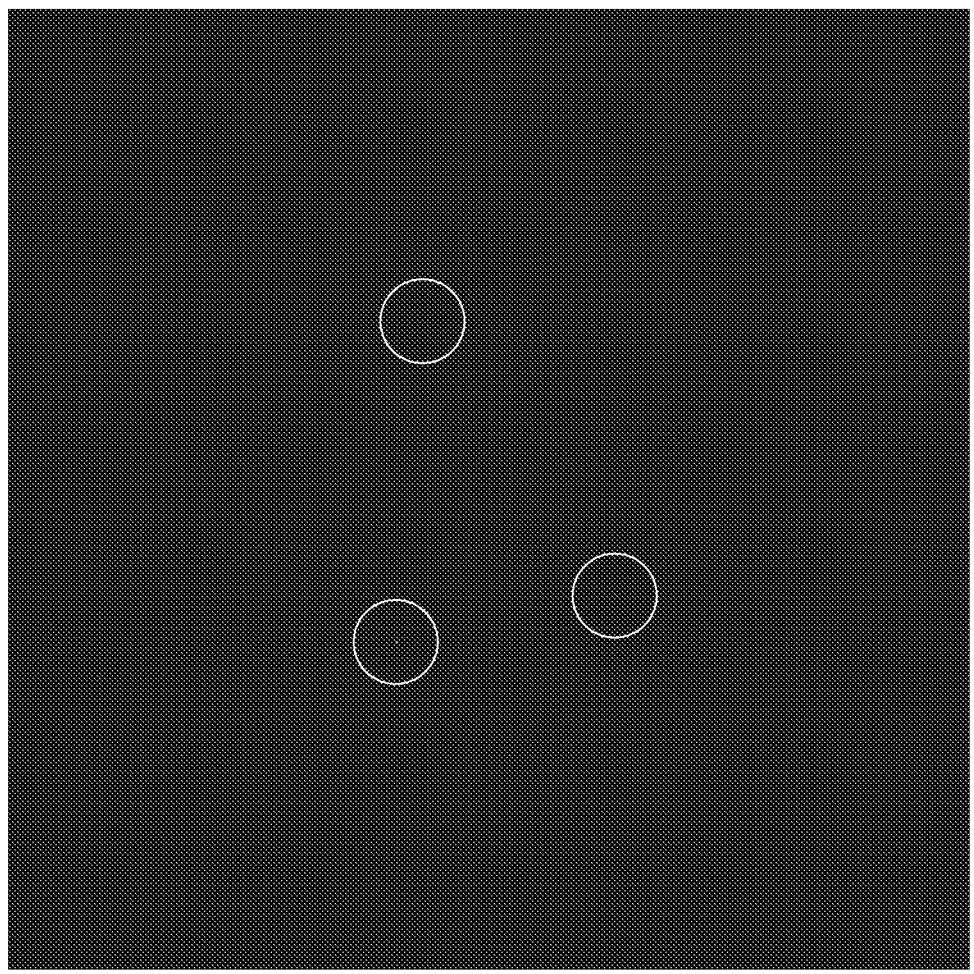
FIG. 8 illustrates a subtracted image according to an embodiment.

In step 206, each buffer image received is processed to convert it into a radial image frame in a similar manner as disclosed for the background image of step 204. This may include simply converting the buffer image into a radial image with no additional processing or may include the application of computer vision techniques and filters to the radial image. The radial image may be referred to as a "foreground image," which is the latest time step radial image. Each foreground image is of the same dimensions and of a resolution that allows for the subtraction of the background image from the foreground image to produce a "subtracted image" (see FIG. 8) with the background noise substantially removed and includes regions of high reflectivity that indicate potential objects of interest (circles of FIG. 8). Each foreground image includes a timestamp that allows a view of the airspace over time to be produced.

Figure 9:
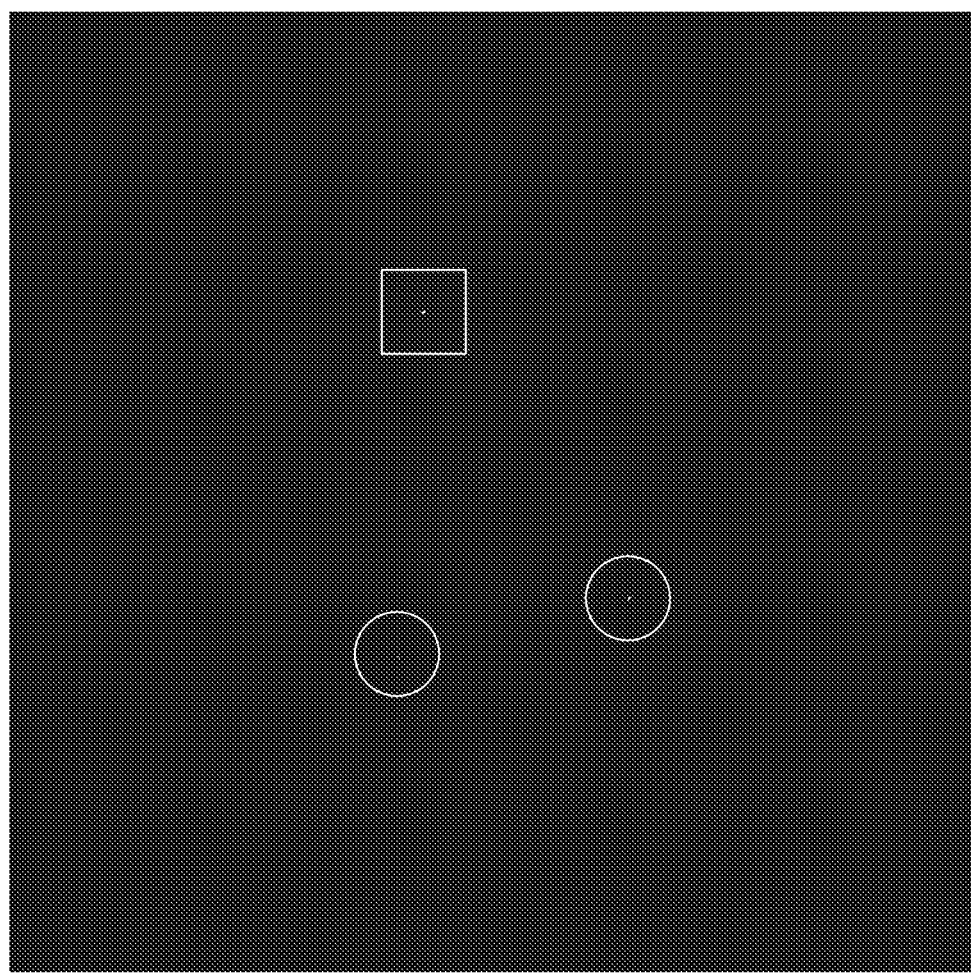
FIG. 9 through FIG. 12 illustrates sequential sample threshold images for four consecutive timestamps according to an embodiment.
Figure 10:
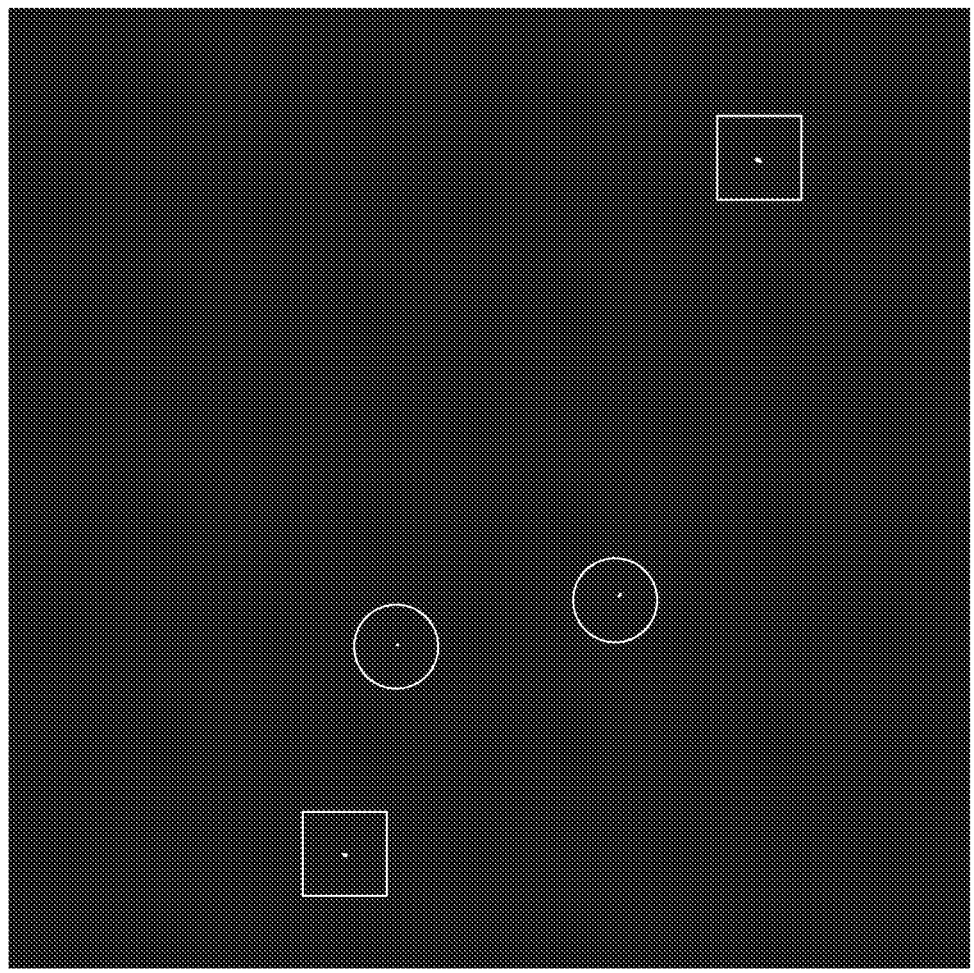
Figure 11:
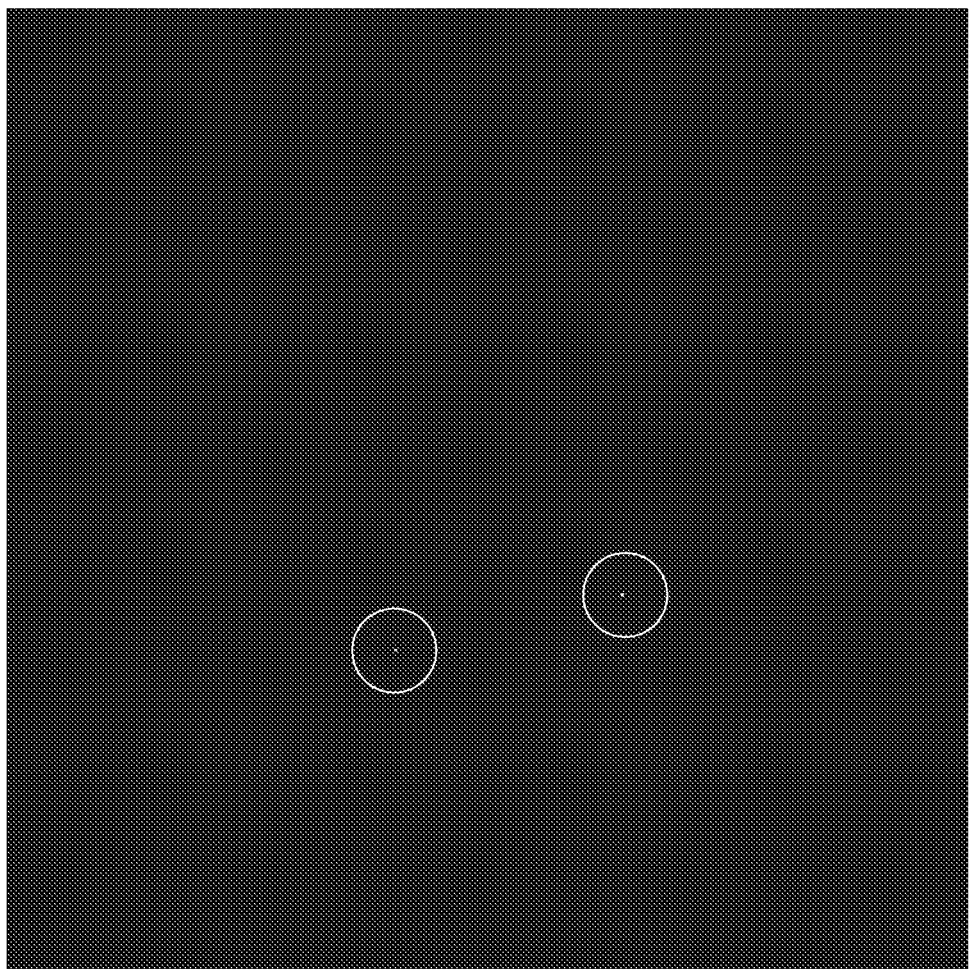
Figure 12:
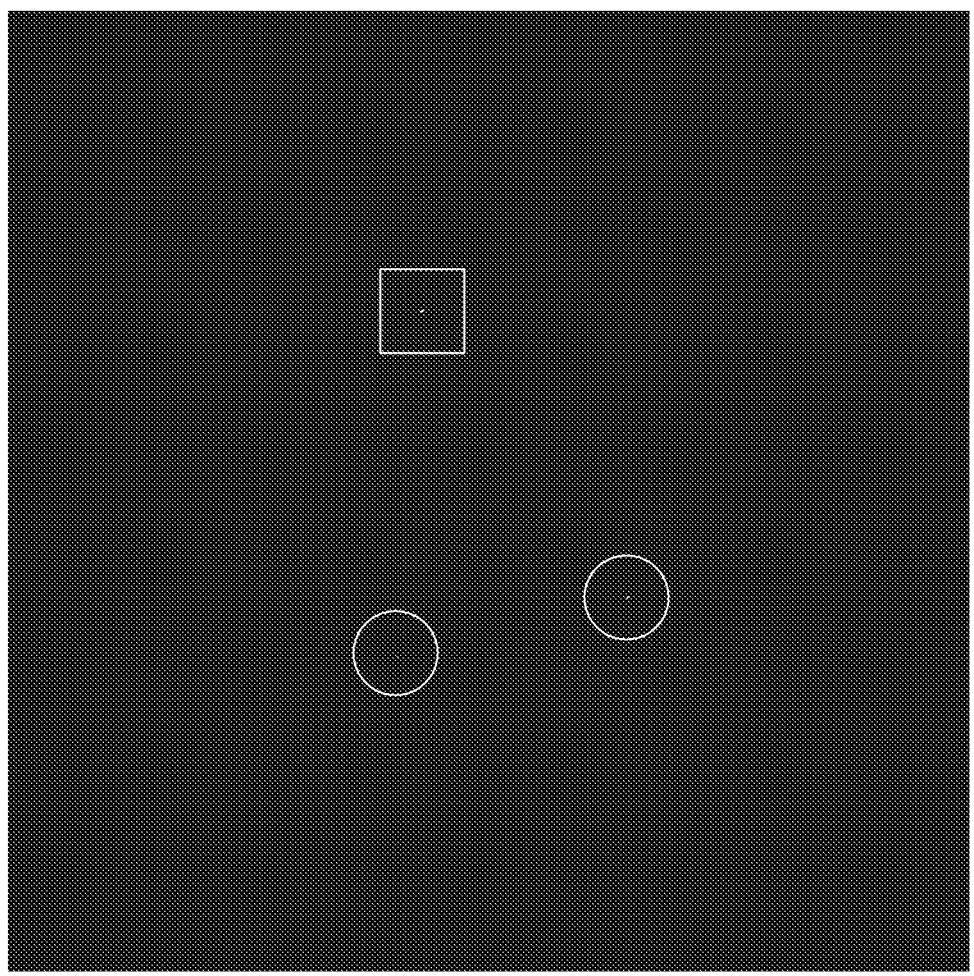

Each subtracted image may be processed to reduce noise levels. In embodiments, this may be done as a two stage process using computer vision primitives. In step 208, "salt and paper" algorithms that uses computer vision primitives such as "Open" and "Close" (growing and corroding pixels in the image), may be used. In step 210, a blur algorithm may be applied to further reduces noise. Other CV transformations, filters, and techniques may also be used. This stage of early "de-noising" greatly reduces the amount of noise observed in later stages of the method and results in a more efficient method and system. As shown in FIG. 9, the image may also have a threshold applied to it where lower values of intensity are ignored (set to 0) and values above the threshold are set to a maximum value, which is 255 in the case where pixel used 1 byte to indicate intensity. The output of denoising steps produces a "threshold image" 900 with reduced levels of noise compared to the subtracted image.

In step 212, the threshold image for each timestamp is processed using computer vision techniques to detect valid tracks of potential flying objects. Tracks are checked for characteristics such as size, shape and complexity versus good tracks gathered from historic observations. The process may take into account that similar sized objects tend to become larger the farther they are from the radar location (center of the radial image). In embodiments, computer vision techniques such as convex hull extraction and contour detection are used to detect tracks in a clean frame. A contour represents a boundary around an object that has defined edges and is typically calculated by determining differences in gradient in the threshold image. Boundaries are used to detect new tracks and updated existing tracks in threshold image. The extracted contours are fed through a chain of heuristic rules to determine if they represent a valid track. They are checked for size, shape and complexity versus good tracks gathered from historic observations. For example, a flying object detected as moving below a speed threshold that has historically proven to be a minimal reasonable value may be processed as noise.

FIG. 9 through FIG. 12 illustrates sample threshold images for four consecutive timestamps. Noise elements or unconfirmed flying objects may be observed in threshold image as indicated by squares. Two contours indicated by circles appear in all four figures and would be reports as stable flying objects by the system.

Embodiments consider a time sequence of threshold images. Previous threshold images are used to identify "regions of interest" that are thought to contain flying objects. When analyzing a new threshold image, the expected location of flying objects is estimated, and regions of interest identified where it is expected that these flying objects will be found in the new threshold image. Regions of interest may be treated differently from the rest of the airspace and flying objects in regions of interest that correspond to the predicted location of a previously detected flying object may be identified using a lower threshold of confidence.

In embodiments, once tracks are extracted at a first time, the process is repeated for the next timestamped threshold image. In an example, a new threshold image for a subsequent timestamp may be processed approximately every 2.5 seconds. The processing of each threshold image will produce another set of tracks. Tracks from the first time are then associated with tracks at subsequent times to start a process of detecting flying objects.

In embodiments, flying objects may have 4 states. When first detected, a reflection in a threshold image, which may be an actual object or noise, is referred to as a "track." If a track is later associated with another track in a subsequent image it is referred to as being in a "potential state," or a "potential state flying object." If the flying object in a potential state continues to be appear in subsequent threshold images, it will be referred to as a "stable flying object." Stable flying objects are assigned an identifier (such as an ID number) and have their history tracked. Finally, when a potential state flying object or a stable flying object is no longer detected, it is referred to as being in an "expired state."

When first detected in a threshold image, a reflection is referred to as a track, and is not typically reported to an end user. If two tracks are associated in threshold images over sequential threshold images, they are classified as a flying object in a "potential state." The number of sequential threshold images that a track must appear in to be classified as a potential state flying object may be selected to limit the number of false positive detections. In an example, a track must appear in at least three consecutive threshold images to be considered a potential state flying object in the airspace.

Tracks have an expiry time of 7.5 seconds (3 frames). If nothing has associated to a track over those 3 frames, it is considered noise and is not reported as a flying object. Similarly, potential flying objects that do not get classified as stable flying objects expire after 7.5 seconds.

A flying object that is classified as a stable flying object expires differently. Once a flying object is classified as stable, the system will attempt to associate it with tracks in future threshold images for a longer period of time such as 30 seconds (12 frames). If nothing is associated with the stable flying object, it becomes classified as being in an expired state for another period of time, such as 30 seconds. In this state, the system continues to attempt to associate future tracks to it but does not report it to the end user. If a track is successfully associated at this stage, the expired flying object may be "recovered" and becomes a stable flying object again, maintaining its previous ID number and the track history. If no recovery occurs over another period of time, such as 30 seconds, the flying object is fully removed from the system.

Further filtering is possible on the flying object layer. For example, if a flying object is moving below a speed threshold that has historically proven to be a minimal reasonable value.

When associating a track from the present threshold image with a historical track from a previous threshold image at least two data dimensions may be considered. A first data dimension is a geospatial dimension that takes the last known position of a flying object. The system performs a heuristic decision to determine if a given new track from the present threshold image "makes sense", that is, it matches known characteristics of flying objects. Association of a track with a flying object compares the previously calculated speed and the direction of the potential flying object and the probability that it would end up at the new position of the present track.

Embodiments may classify tracks and flying objects including labeling them as the entities they represent in the real world. For example, a flying object could be labeled as a Cessna, as a flock of birds, or as noise. Furthermore, analysis of the underlying characteristics of the shape, complexity and intensity of the tracks, coupled with properties extracted from the flying object characteristics and embedded with terrain landmarks (such as roads, towns, cities etc.) can be used to produce automated labeling of flying objects with a high degree of accuracy and assist in reducing the amount of false negatives.

A second data dimension includes analysis of computer vision attributes. This dimension includes comparing attributes such as the complexity of the shape, average values of the pixels and area approximations.

Methods and systems described herein may preserve and utilize historical knowledge of the past timeframes for periods of time. When processing a new frame, "extra" attention may be paid to regions where flying objects or tracks have been observed in the recent past. Those regions can then be processed using different weights and heuristic rules when compared to regions where no flying objects have been recently detected.

Figure 13:
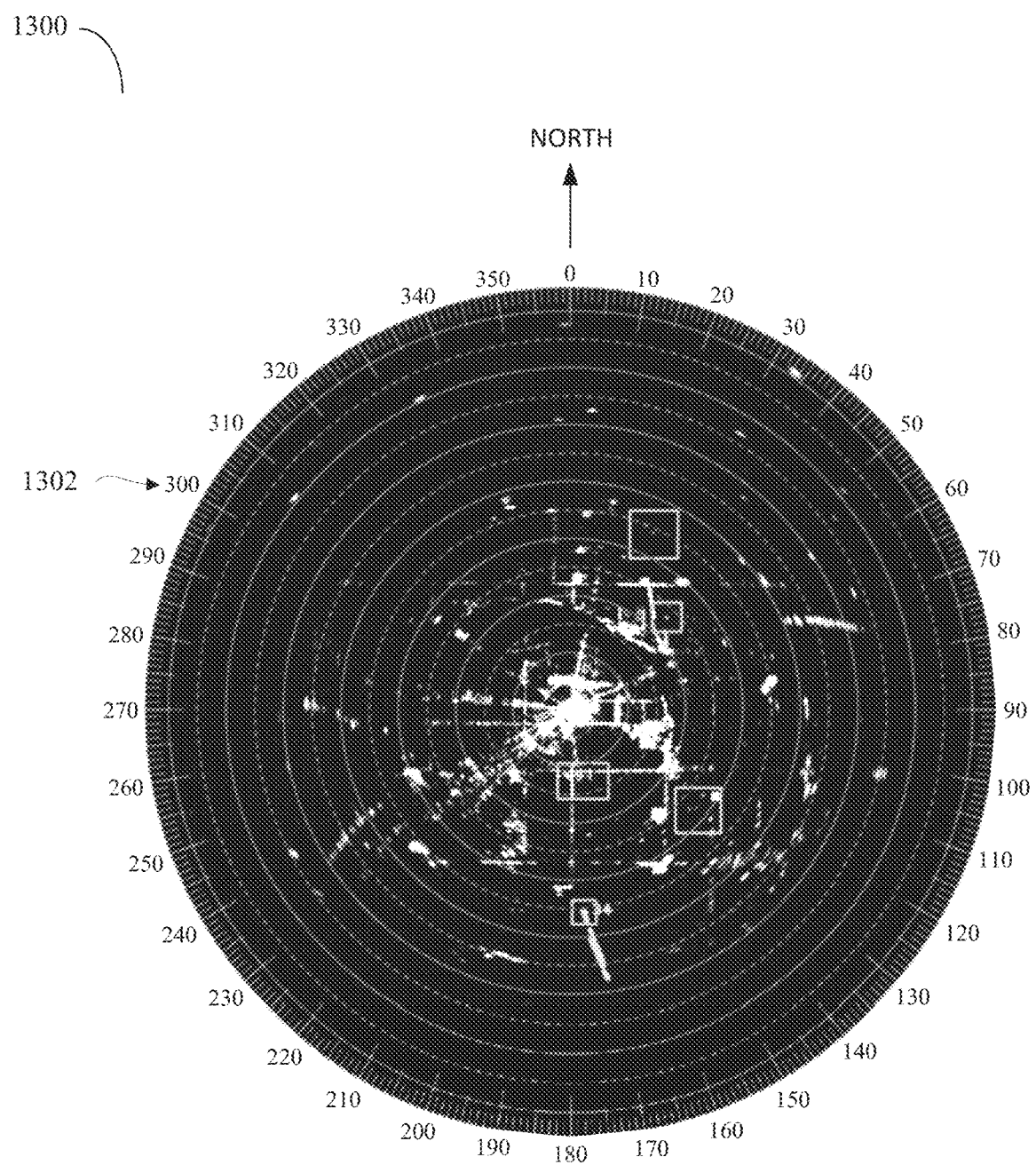
FIG. 13 illustrates a radial image display with regions indicated according to an embodiment.

FIG. 13 illustrates an embodiment displaying a radial image 1300 where regions are outlined. The top of the image is north and angles 1302 are annotated on the edges of the circle. Rings indicate distance from the center of the image (radar location) at intervals of 0.5 NMi per ring. Image 1300 shows the latest radial image for a given installation mission, with 5 regions of interest highlighted in grey rectangles. There are two empty rectangles—the first one is to the north east quadrant at about 30 degrees of heading and 3.5 nautical miles in and the other is at 125 degrees of heading about 3 NMi out. These two Regions of Interest (ROI) are there because in the directly previous frame there were tracks identified in those areas. Processing software will process ROIs and filter noise with a more permissive filter for that region in an effort to see something in an area where it has been seen in the past.

The next element worth noting is the region of interest with a dot in the center which annotates a track that has just been discovered in this frame. It has not yet been associated with any other tracks and does not form a flying object. Also illustrated is a stable flying object with the ID 34. This track has been observed for several frames. Movement of flying objects may be indicated by the use of color with a latest track having one color while all previous tracks that make up the flying object have a different color to indicate the "tail" of the flying object. Also indicated is recently discovered flying object 41. This object was discovered in a region of interest from a previous track.

In step 218, a list of tracks that are associated with newly identified or updated flying objects is generated. This list is exported in the form of geospatial data points and attributes. This list may be used to update the operator's display 110 to indicate flying objects in the airspace of the drone 114, whether within line of sight or beyond line of sight. The list of flying objects may also be input into automatic flight or avoidance systems.

The system may output information in several different ways. One method is for the system to export log files for every timeframe as a JSON file to the hard drive or to be transmitted to another system. Different levels of logging may be supported. A base level may include logs from the "Sensor Box" which include the raw logs from the radar layer or the ADS-B layer. An aggregated log of an Airspace Management Server (AMS) output may also be made available. Furthermore, both the images and the data insights extracted from the radar processing may be made available.

In embodiments, the data may be exported to an Airspace Management Server system which allows for the use of track and flying object information in real time. An airspace management server consists of an additional layer that allows different sensors to associate their reported flying objects into a coherent single layer of presentation. For example, an airspace management server may support two types of sensors such as radar and "automatic dependent surveillance-broadcast" (ADS-B) surveillance technology. This allows a user presentation layer to display a consolidated view of agents in the airspace with meta-data about which sensors have visibility on them. For example, a helicopter that has ADS-B on board and is detected by the radar will appear as a single flying object (with meta data from both sensors). A small Cessna 172 within the radar range but with no ADS-B would appear in the same report, but only with the radar meta-data. Finally, a 747 from a much higher altitude and outside of the radar range will appear with only the ADS-B meta-data. All 3 consolidated flying objects will be part of the same report and the same visualization layer.

Another method of outputting data is the use of a plugin to be used by ground control station software, to integrate output data into their visualizers. The communication between the AMS and the visualization layer may be performed over a network connection, such as Web Socket technology with a custom-made messaging protocol. Integrating embodiments with Ground Control Station (GCS) systems that utilize two-way communication technology allows for the automation of risk management assessment for a drone operator. The drone location may be continuously reported to the AMS system which performs distance calculations of all known agents in the airspace. Additional information, such as weather data and population density (sourced from external web API and an inhouse census-based web service) may be integrated into the above risk calculation.

Figure 14:
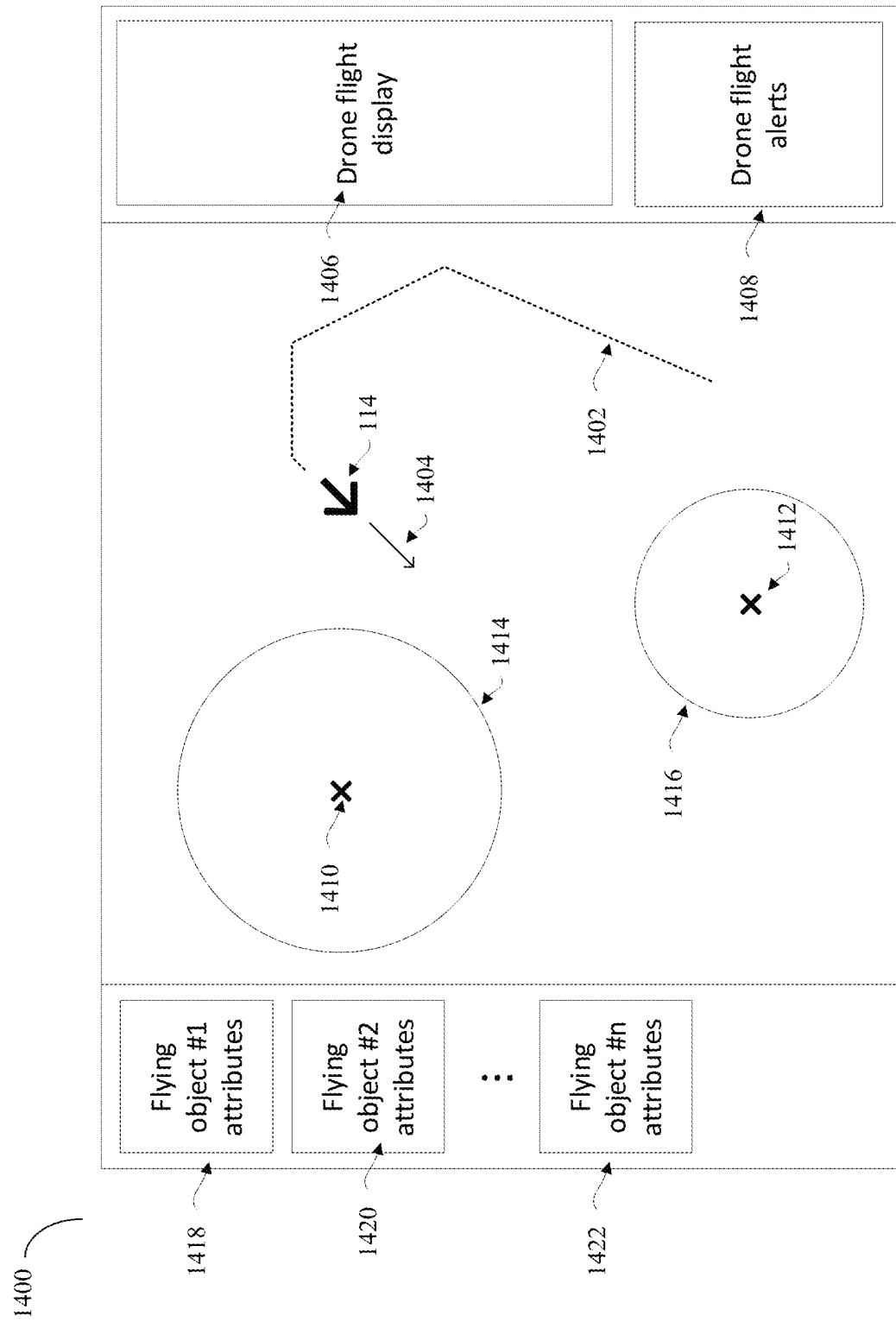
FIG. 14 illustrates a user interface for controlling a drone, according to an embodiment.

FIG. 14 illustrates a user interface 1400 displayed on operation display 110 for controlling a drone, according to an embodiment. A central area displays a full or partial view of the airspace of the drone 114. The airspace may be oriented so that the direction of the drone's travel is always up, by geographic direction (north is up), or by using another coordinate system. A 2D or 3D view may be displayed and features such as elevation, weather conditions, off limit areas, permitted flight path boundaries, etc. may be indicated. Drone 114 is indicated by an icon or image that may be oriented to indicate a direction of travel. The past path 1402 of the drone may be indicated as well as a future path 1404. Identified flying objects 1410 and 1412 may be indicated on the display. Each flying object 1410 and 1412 may have a respective area 1414 and 1416 indicated to indicate features such as a keep out zone in with drone 114 may not or should not enter. Areas 1414 and 1416 may have regular shapes such as circles or ovals, or irregular shapes, such as polygons. Graphical indicators for drone 114 and flying objects 1410 and 1412 312 may show parameters such as altitude, direction, speed, etc.

The display may include an operational area and a "Specific Operations Risk Assessment" (SORA) compliant within. Information and attributes related to flying objects 1410 and 1412 as well as other tracks detected by the system may be obtained from the list of flying objects 220 obtained through the method for detecting flying objects 200 described herein. There may also be visual feedback for areas of high clutter XXX in which visibility with the radar is greatly reduced. Information from the drone control system and line of sight detection equipment and methods may be combined with information from the BVLOS apparatus, and system described herein to provide a comprehensive view of drone 114 and its operation within its airspace.

The right side of user interface 1400 may display GCS controls for flying a drone 114 and includes information used to monitor and control drone 114 such as in drone flight display area 1406. Drone flight alerts and other messages may be displayed in area 1408.

The left side of user interface 1400 may display information related to flying objects. For example, information and attributes related to flying object 1410 may be displayed in area 1418 and information and attributes related to flying object 1412 may be displayed in area 1420. Information and attributes related to other flying objects or other tracks may be displayed in area 1422.

It is understood that user interface 1400 may take any number of forms as is known in the art including the information displayed, the user interface layout, colors, visual indicators, overlays, etc.

Figure 15:
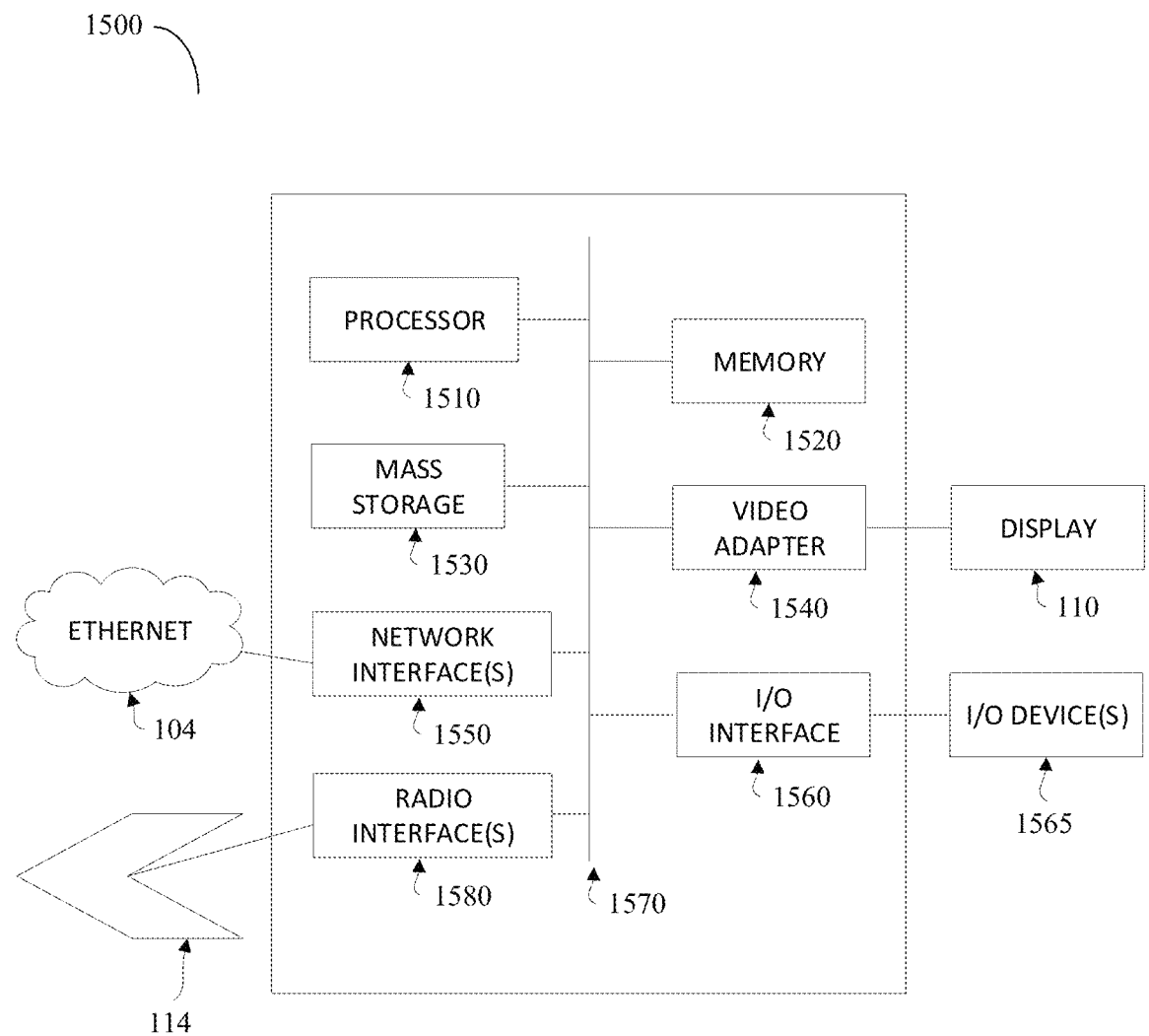
FIG. 15 illustrates a computing device for implementing the methods described herein, according to an embodiment.

FIG. 15 is a schematic diagram of an electronic device 1500 that may perform any or all of operations of the above methods and features explicitly or implicitly described herein, according to different embodiments of the present invention. For example, a computer equipped with network function may be configured as electronic device 1500.

As shown, the electronic device includes a processor 1510, such as a Central Processing Unit (CPU) or specialized processors such as a Graphics Processing Unit (GPU) or other such processor unit, memory 1520_420, non-transitory mass storage 1530, I/O interface 1560, network interface 1550, and video adapter 1540, and a radio interface 1580, such as a transceiver, all of which are communicatively coupled via bi-directional bus 1570. Video adapter 1540 may be coupled to operator display 110. I/O interface 1560 may be coupled to one or more I/O devices 1565. According to certain embodiments, any or all of the depicted elements may be utilized, or only a subset of the elements. Further, the device 1500 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1520 may include any type of non-transitory memory such as static random access memory (SRAM), dynamic random access memory (DRAM), synchronous DRAM (SDRAM), read-only memory (ROM), any combination of such, or the like. The mass storage element 1530 may include any type of non-transitory storage device, such as a solid state drive, hard disk drive, a magnetic disk drive, an optical disk drive, USB drive, or any computer program product configured to store data and machine executable program code to implement the methods described herein. According to certain embodiments, the memory 1520 or mass storage 1530 may have recorded thereon statements and instructions executable by the processor 1510 for performing any of the aforementioned method operations described above.

Network interface 1550 may be used to interface with radar 102 over a computer or communications network such as Ethernet. Radio interface 1580 may be used to communicate with drone 114 using a standardized or customer radio and protocol. An example of a standard radio interface is STANAG 4586, though embodiments are not limited to a particular radio protocol.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, tablet, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for tracking airborne objects, the method comprising:
receiving a data set including a plurality of buffer images, each buffer image of the plurality of buffer images defining respective airspace radar reflections each having associated thereto a respective azimuth and a respective distance, each buffer image of the plurality of buffer images having associated thereto a respective timestamp;
converting each of a plurality of sets of buffer images from among the plurality of buffer images into a respective radial image to produce a corresponding plurality of radial images, each set of buffer images of the plurality of sets of buffer images including one or more buffer images from among the plurality of buffer images having associated thereto a same respective timestamp;
subtracting a background image from each one of the plurality of radial images to produce a corresponding plurality of subtracted images;
denoising, by using one or more computer vision primitives, each one of the plurality of subtracted images to produce a corresponding plurality of threshold images, each threshold image of the plurality of threshold images having associated thereto the timestamp of the corresponding set of buffer images and defining processed airspace radar reflections corresponding to the respective airspace radar reflections of the corresponding set of buffer images;
comparing, by using one or more computer vision techniques, one or more characteristics of at least one same processed airspace radar reflection of a set of threshold images from among the plurality of threshold images against a set of historic observations to detect a track within the set of threshold images, the timestamps associated with the set of threshold images being consecutive;

comparing the track across the set of threshold images to identify the track as a flying object;

storing a set of geospatial data points and attributes for the flying object in accordance with a respective azimuth and a respective distance corresponding to the at least one same processed airspace radar reflection; and consolidating the set of geospatial data points and attributes for the flying object with a set of automatic dependent surveillance-broadcast metadata.

2. The method of claim 1 further comprising updating the background image prior to receiving the data set.

3. The method of claim 1 wherein denoising, by using the one or more computer vision primitives, each one of the plurality of subtracted images includes applying a salt and pepper algorithm and a blur algorithm to at least one subtracted image of the plurality of subtracted images.

4. The method of claim 1 wherein using the one or more computer vision techniques includes applying a contour algorithm to at least one of the plurality of threshold images.

5. The method of claim 1 wherein comparing the track across the set of threshold images to identify the track as a flying object includes comparing the track to a known flying object characteristic.

6. The method of claim 1 wherein comparing the track across the set of threshold images to identify the track as a flying object includes comparing the track to a known aircraft schedule.

7. The method of claim 1 wherein the set of geospatial data points and attributes includes a level of confidence of the identification of the flying object.

8. The method of claim 1 wherein the track in a first threshold image of the plurality of threshold images is used to define a region of interest in subsequent threshold images of the plurality of threshold images, and detecting the track within the set of threshold images includes searching for the track within the region of interest.

9. The method of claim 1 wherein comparing the track across the set of threshold images to identify the track as a flying object includes applying one or more additional computer vision techniques to the plurality of threshold images.

10. The method of claim 9 wherein the one or more additional computer vision techniques include convex hull extraction or contour detection.

11. The method of claim 1 wherein the data set includes data in a 360 degree direction around a geographic point.

12. A system for controlling a drone within a beyond visual line of sight (BVLOS) airspace, the system comprising:

a network interface configured to receive a data set including a plurality of buffer images, each buffer image of the plurality of buffer images defining respective airspace radar reflections each having associated thereto a respective azimuth and a respective distance, each buffer image having associated thereto a respective timestamp;

an operator display; and a computing device including a CPU and a non-transitory memory storing instructions that when executed by the CPU causes the computing device to:

convert each of a plurality of sets of buffer images from among the plurality of buffer images into a respective radial image to produce a corresponding plurality of radial images, each set of buffer images including one or more buffer images from among the plurality of buffer images having associated thereto a same respective timestamp;

subtract a background image from each one of the plurality of radial images to produce a corresponding plurality of subtracted images;

denoise, by using one or more computer vision primitives, each one of the plurality of subtracted images to produce a corresponding plurality of threshold images, each threshold image having associated thereto the timestamp of the corresponding set of buffer images and defining processed airspace radar reflections corresponding to airspace radar reflections of the corresponding set of buffer images;

compare, by using one or more computer vision techniques, one or more characteristics of at least one same processed airspace radar reflection of a set of threshold images from among the plurality of threshold images against a set of historic observations to detect a track within the set of threshold images, the timestamps associated with the set of threshold images being consecutive;

compare the track across the set of threshold images to identify the track as a flying object;

store a set of geospatial data points and attributes for the flying object in accordance with the respective azimuth and the respective distance corresponding to the at least one same processed airspace radar reflection; and consolidate the set of geospatial data points and attributes for the flying object with a set of automatic dependent surveillance-broadcast metadata.

* * * * *